Sept. 29, 1970 J. R. HERR 3,531,632

ARITHMETIC SYSTEM UTILIZING RECIRCULATING DELAY LINES WITH DATA STORED IN POLISH STACK FORM

Filed June 30, 1967 3 Sheets-Sheet 1

| ASC | 1 | 2 | 3 | 4 | 5 | 0 |
|---|---|---|---|---|---|---|
| ADD / SUB | SHIFT DOWN R4 THRU R1 | ALGEBRAICALLY ADD/SUB R0 AND R1 AT C14 IF R1 NEGATIVE COMPLIMENT | | | | WRITE R0 TO ZERO |
| ASC | 1 | 2 | 3 | 4 | 5 | 0 |

FIG_5

| ASC | 1 | 2 | 3 | 4 | 5 | 0 |
|---|---|---|---|---|---|---|
| MULT. | SHIFT R1 INTO R0. SET DC TO 13 | SHIFT R2 LEFT 1 COLUMN | ADD R0 TO R1 COUNT DOWN R2C15 DIGIT FOR EACH ADDITION | SHIFT R1 LEFT 1 COLUMN WITH R1C14 SHIFTING INTO R2C2. GO TO ASC2 COUNT DOWN DC. IF DC IS 0 AND: (a) DPI NOT SET THEN SET DPI AND SET DC TO 8. (b) DPI SET GO TO ASC5 | SHIFT DOWN R4 THRU R1 | WRITE R0 TO 0 C1 – C15 |
| DIV. | SHIFT R1 INTO R0. SET DC TO 14 | SUBTRACT R0 FROM R1 IF NO OVERDRAFT ADD 1 TO R2C2 IF OVERDRAFT ADD R0 TO R1 | SHIFT R2 LEFT 1 COLUMN, WITH R2C14 SHIFTING INTO R1C2 | SHIFT R1 LEFT 1 COLUMN GO TO ASC2 COUNT DOWN DC. IF DC IS 0 AND: (a) DPI NOT SET THEN SET DPI. SET DC TO 5 (b) DPI SET GO TO ASC5 | SHIFT DOWN R4 THRU R1 | |
| ASC | 1 | 2 | 3 | 4 | 5 | 0 |

FIG_6

3,531,632

ARITHMETIC SYSTEM UTILIZING RECIRCULATING DELAY LINES WITH DATA STORED IN POLISH STACK FORM

Joseph R. Herr, Los Altos Hills, Calif., assignor to The Singer Company, a corporation of New Jersey Filed June 30, 1967, Ser. No. 650,313
Int. Cl. G06f 7/38
U.S. Cl. 235—176 5 Claims

ABSTRACT OF THE DISCLOSURE

Apparatus for arithmetically combining digits which appear sequentially on a recirculating data train by recirculating the data train through a one-digit shift register and as a predetermined digit is being shifted out of the shift register, adding or subtracting it to a digit subsequent to it on the data train, with the result being inserted onto the data train.

FIELD OF INVENTION

This invention relates to an improvement in electronic digital computers, and more particularly to the arithmetic section of an electronic computing apparatus.

CROSS REFERENCES

Peter E. Osborn, "A Delay Line Resynchronization Apparatus" filed Feb. 15, 1967, Ser. No. 616,222, now Pat. No. 3,465,301, having a common assignee.

PRIOR ART

In recent years, electronic computers which utilize delay lines for data storage have come into common use, especially in the desk top computer field.

The delay lines in these computers provide small, reliable, inexpensive fugitive memory means for retaining a moderate amount of data for use in calculations. Usually associated with the delay line is a timing means, a plurality of registers and control logic. The timing means comprising a series of counting devices is synchronized with the data bits on the delay line to enable the control logic to identify the significance of data on the delay line.

The data on the delay line may be interspersed in one of several different manners such that the entire data train on the delay line comprises a plurality of multi-digit numbers. In one manner in particular, the Polish stack, the successive digits of each number do not occur sequentially on the data train, but instead the digits representing the same order within each of the numbers, are grouped sequentially together. In this way the units order digits of all the numbers are grouped to occur consecutively, then the tens orders digits, etc. With this type of data organization on the delay line, the basic arithmetic functions of adding or subtracting two particular numbers is accomplished easily by adding or subtracting, as the case may be, like order digits of the two numbers in each order grouping, that is, the digits of the two numbers are added/subtracted in the units order, then the tens orders, then the hundreds order, etc. Any carry or borrow resulting from the arithmetic operation in a particular order is propagated and affects the arithmetic operation of the next order of digits.

Present state of the art machines employ a "pulse count" digit, that is, a numeral "5" in a number is represented by five serial pulses on the delay line during a given period of time. These machines recirculate the serial data train of pulse count digits through a plurality of one digit registers external to the delay line. The pulses of a digit emerging from the delay line are counted serially into a first register of the external recirculation path. Each pulse in a digit entered into the register will cause the register to advance by one count. The digit (i.e. pulses) stored in the first register is then parallel shifted into a second register which is counted down to a zero configuration. Each decreasing count of this second register results in a pulse being launched on the delay line. Normally, when the digit is parallel shifted from the first register to the second register, the first register is caused to be zero set or cleared so that the next digit to emerge from the delay line may be serially counted into the first register.

To accomplish the addition of two digits, the control logic of the machine need only inhibit the zero setting of the first register. A second digit emerging from the delay line is therefore added to a first digit already contained in the register. For subtraction of a second digit from a first digit, the control logic inhibits the zero setting of the first register and, as the pulses of the second digit emerge from the delay line, the control logic will cause the first register to be counted down by each incoming pulse of the second digit instead of up as is done in addition.

The pulse count machines have generally allowed, on the delay line, a digit time of almost twice that absolutely necessary. A digit time will have three or four vacant bit or pulse times or buffer bit times, both preceding and following the nine pulses necessary for the representation of a decimal digit. This extended period of time allows the nine pulses of the digit to emerge from the delay line, either a few pulse times early or a few pulse times late in relation to the timing and yet still be recognized as being or belonging to a particular digit. This is true because each pulse emerging from the delay line causes the first register to advance one count, regardless of the position in the digit that the pulse occurs. The only limitation being that the digit pulses or data bits must occur between the beginning and the end of the digit time, as defined by the timing means.

Pulse count notation requires a longer data train than would be necessary if a position notation system were employed. A position notation system, such as binary coded decimal, would require a maximum of four bit positions to represent a decimal digit, which is less than one-half the nine pulses necessary in the pulse count system. Since a position notation system requires accurate synchronization between the timing means and the data train to enable the control logic to determine the exact significance of a bit or pulse or lack of a bit or pulse each bit or position time, buffer bits preceding and following the digit bits may be eliminated, thus resulting in additional savings. It is apparent, therefore, that a data train in a machine employing a position notation system, may be only one-fourth as long as a data train in a pulse count machine.

A pulse count machine, to accomplish the arithmetic operations described previously, must employ at least two registers external to the delay line. The first register is counted up or down depending on the arithmetic operation being performed as a digit is read from the delay line and the second register is counted down by the control logic to insert a digit onto the delay line. A single register cannot be used in a machine of this type, since all the bistable elements in a register must be used during the entire digit time for the counting up or down process. In other words, a single register cannot be counted both up and down simultaneously. If the machine were adapted to use a position notation system, a single register external to the delay line could be used to both serially copy bits of a digit from the delay line and simultaneously serially shift its previous contents onto the delay line. This adaptation eliminates the necessity of at least two registers and also cuts in half the minimum time required for the data train to recirculate through its external registers.

Present state of the art machines employing the recirculating Polish stack data train do not provide the capability of storing numbers in addressable locations. This added capability is generally not justified when balanced against the cost of the additional hardware required.

OBJECTS

Accordingly, an object of the present invention is to provide an improved electronic digital computer.

Another object of the present invention is to adapt an electronic digital computer to the use of a position notation system of data representation.

Yet another object of the present invention is to provide an electronic digital computer with a simplified means of performing arithmetic operations.

SUMMARY OF THE INVENTION

In accordance with one aspect of the present invention, a one-digit register and a delay line are provided to recirculate a data train of position notation digits, either directly upon the delay line, or through the register, as determined by a control means.

In accordance with another aspect of the present invention, pairs of digits recirculating on a data train are arithmetically combined by causing a one-digit register to copy the first digit of the pair and when the second digit of the pair appears on the data train, it is added (subtracted) to (from) the digit in the register, with the result being retained in a digit position on the data train.

In accordance with another aspect of the present invention, two recirculating Polish stack data trains are provided with each data train having a one-digit shift register associated with it, through which it may recirculate. The respective recirculation times of the two data trains being such that the first data train may recirculate completely in the time required for a single order of the second data train to recirculate. An address register is also provided which will retain the address of a storage location on the second data train into which or out of which data is to be transferred. Logic means will control the transfer of data between the two data trains which is accomplished by shifting the contents of a particular register recirculating on the first data train left one order, retaining the most significant digit in the shift register associated with that data train and then transferring it to the shift register associated with the second data train where it is retained until the first order of the second data train appears. The retained digit is then shifted onto the second data train when the storage location in that order occurs which matches the storage location retained in the address register. This process is repeated for each order of data on the second data train as it recirculates.

BRIEF DESCRIPTION OF THE DRAWINGS

This invention, as well as other features, objects and advantages thereof, will be readily apparent from consideration of the following detailed description relating to the accompanying drawings, in which like reference characters designate like, or corresponding, parts throughout the several views and wherein:

FIGS. 5 and 6 each illustrate an operation chart illustrating the logical sequence of events for particular operations.

DESCRIPTION OF A PREFERRED EMBODIMENT

Figure 1:
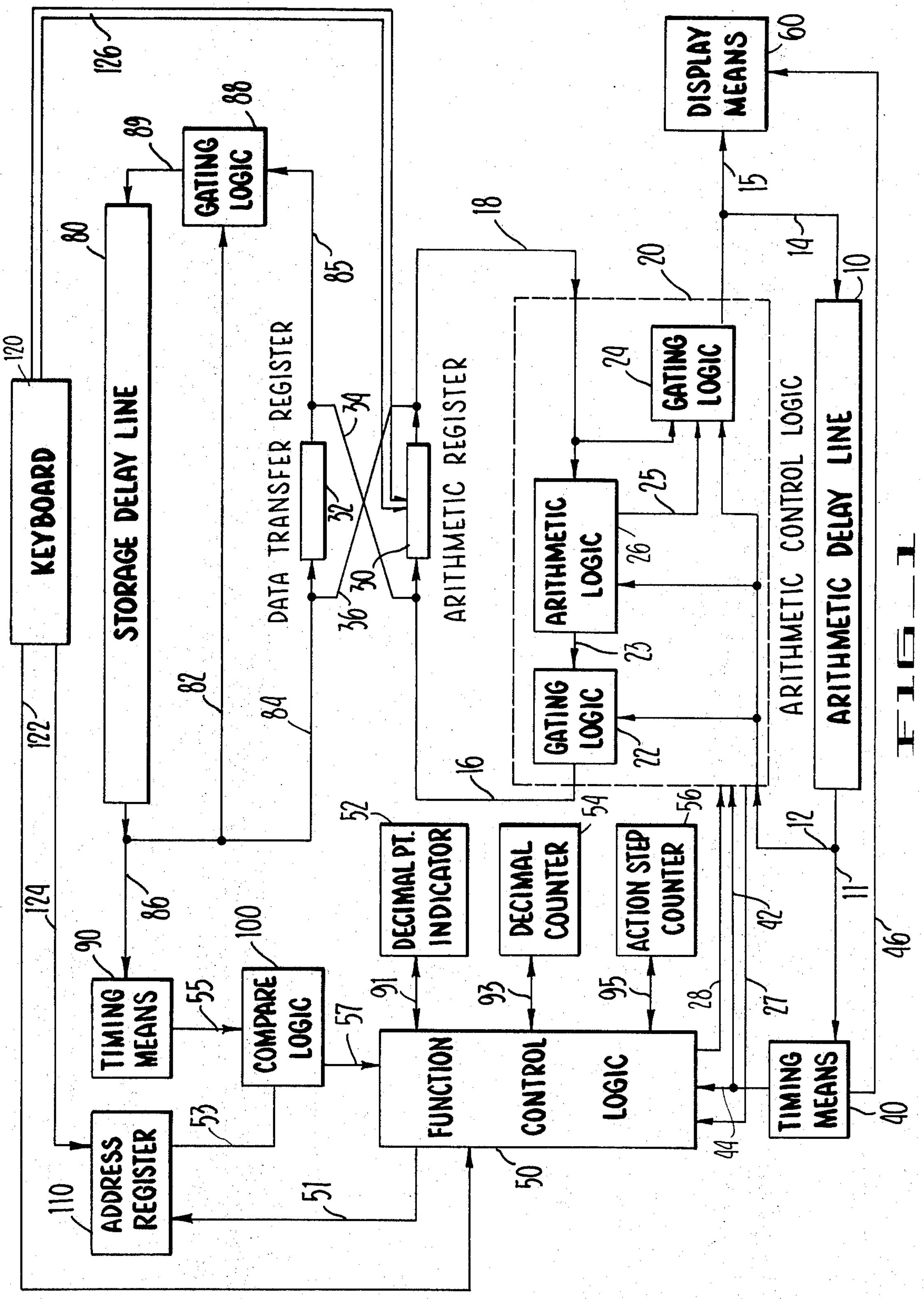
FIG. 1 is a block diagram of a system embodying the present invention.

Referring now to FIG. 1, there is shown a block diagram of a system embodying the present invention which includes: an arithmetic section comprising an arithmetic delay line 10, arithmetic control logic 20, timing means 40 and an arithmetic register 30; an input/output section comprising a keyboard 120 and a display means 60; a control section comprising function control logic 50, decimal point indicator 52, decimal counter 54, action step counter 56, compare logic 100 and address register 110; and a data storage section comprising a storage delay line 80, timing means 90, data transfer register 32 and gating logic 88.

The arithmetic manipulations of numbers is performed by the arithmetic section under the direction of the control section. Numbers having one or more digits or numerals, each digit being in a whole integer or decimal fraction position or order to be operated upon by the arithmetic section are entered into the machine from a keyboard 120. The numbers are inserted on the arithmetic delay line 10 and recirculated therethough during the operations. The particular operation to be performed by the arithmetic section is initiated by the keyboard 120. The control section responds to the particular operation selected on the keyboard 120 and generates predetermined logic signals which will cause the arithmetic section to react in a particular fashion. The results of the operation may be observed on the display means 60 which, in the preferred embodiment, comprises a mechanical printer. The data storage section provides storage capacity for the system. Numbers may be stored in particular storage locations on the storage delay line 80 and may also be extracted from the storage delay line by direction of the keyboard 120. These operations will be discussed in more detail hereinafter.

Figure 2:
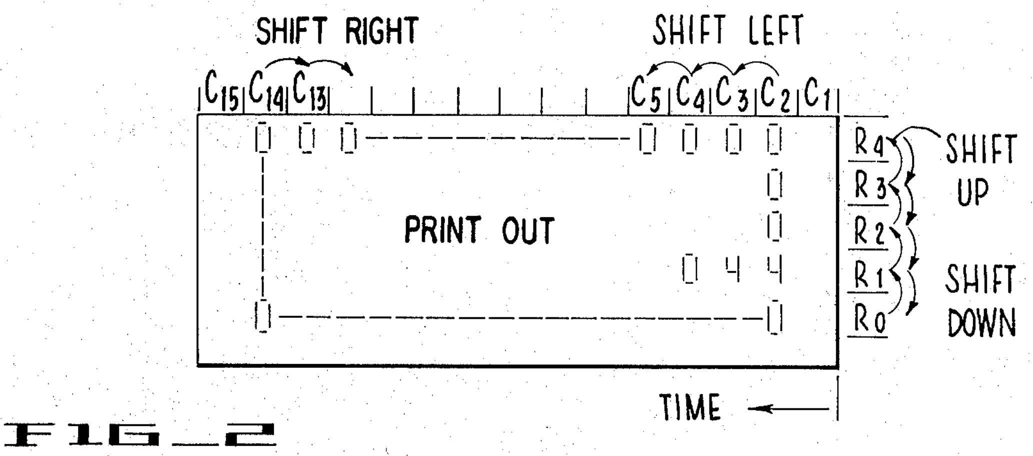
FIG. 2 is a display screen representation of the logical organization of the data on the memory means.

The numbers entered into the arithmetic section are retained on the arithmetic delay line 10. The arithmetic delay line 10 is adapted to continuously recirculate the numbers contained thereon. As the numbers recirculate, they are sensed by display means 60 and displayed in a manner shown in FIG. 2. The numbers contained on the delay line 10 may be considered to be contained in a plurality of registers, such as the five data or number registers, R0, R1, R2, R3 and R4. Each number register comprises fifteen orders or columns, C1 through C15. Column C1 is the sign column and column C15 is a special column reserved for special logical use. The effective length of each number register is, therefore, thirteen columns or orders. The numerals or digits contained in these number registers may be shifted. A shift up as seen in FIG. 2 will cause the contents of number register R0 to be shifted into number register R1, number register R1 is shifted into number register R2, number register R2 is shifted into number register R3, and number register R3 is shifted into number register R4, the number contained in number register R4 is lost or vanishes. A shift down is just the opposite. A shift left results in the number or digits in the number in a number register being shifted one digit order to the left.

Figure 3:
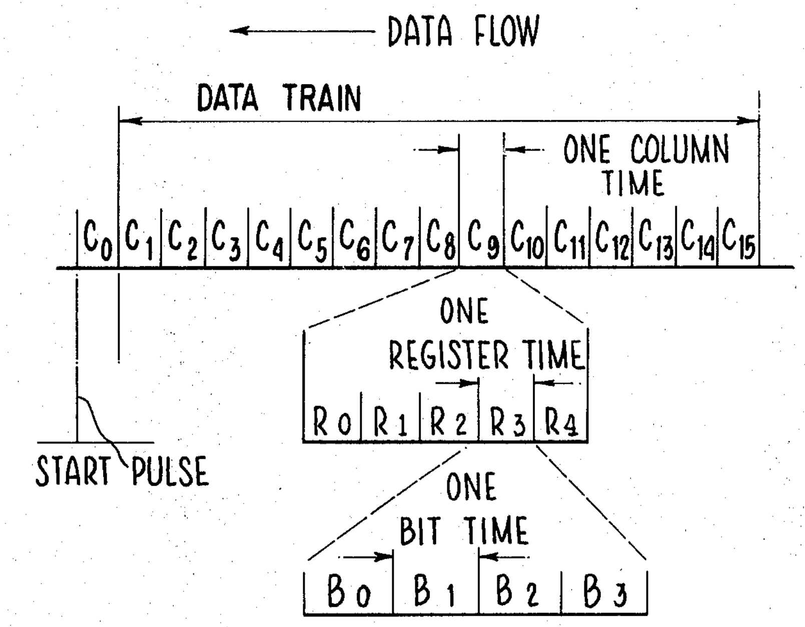
FIG. 3 illustrates the data organization on the memory means.

The manner in which the numbers displayed in FIG. 2 are organized or contained on the delay line 10 is shown in FIG. 3. The first bit or pulse emerging from the arithmetic delay line 10 is the start pulse occurring at space-time segment C0 and indicates to the machine that the beginning of the data train is emerging. Following the start pulse is column C1 space-time segment followed by column C2 space-time segment, etc. Within each column space-time segment are five register space-time segments R0–R4 with each register space-time segment further divided into four bit space-time segments B0, B1, B2, B3. It is apparent from FIG. 3 that all the digits of the same order of the number registers are grouped together and that each group of digits is a column of the number registers with the columns appearing in logically ascending significance.

The shift up, as previously discussed in connection with FIG. 2, can be seen in FIG. 3 to require that each digit within each column be delayed by one register time. A shift down would require that each digit within each column be advanced by one register at a time, and that a shift leg of the numeral or digits a particular number register would be required that the register digit within each column be delayed one column time.

The start pulse appearing in column time C0 is the first pulse of the data train and is a synchronization pulse for initiating operation of the timing means 40 (FIG. 1). As bits emerge from the arithmetic delay line 10 they are sensed by the timing means 40 on line 11. The timing means 40 is shown in more detail in FIG. 4. A continuously running oscillator 61 is connected to one input of an AND gate 62. A flip-flop 63, called the home flip-flop, has its false or $\overline{\text{Home}}$ output connected to a second input to AND gate 62. The rest input of the flip-flop 63 is line 11 which receives the bits as they emerge from the arithmetic delay line 10. The only bit of significance which is sensed by the flip-flop 63 on line 11, however, is the start pulse. When the start pulse is received on line 11, the flip-flop 63 is reset, causing the $\overline{\text{Home}}$ signal to be true, thus enabling gate 62. As long as flip-flop 63 is false or reset, gate 62 is enabled and its output on line 65 will follow the output of oscillator 61. Fractional bit counter 66 receives the signals on line 65, shapes them and divides by four, generating a square wave on line 67. Bit time counter 68 comprises two flip-flops (not shown) connected in series so that each flip-flop divides its output by two. Counter 68, therefore, divides its input by four. During one cycle of the flip-flops in counter 68, four binary configurations are encountered. Each configuration defines a particular binary bit time. Counter 68, accordingly, has an output on line 69 to register time counter 71 once every four bit times. The register time counter 71 comprises three flip-flops (not shown) interconnected to recycle after five inputs on line 69. Each pulse received by counter 71 one line 69 will cause the counter 71 to advance one count. Every five counts a signal will be generated on line 72 to column time counter 73. Counter 73 comprises four flip-flops (not shown) interconnected as a counter to advance one count for every pulse received on line 72. Each count of the counter 73 represents one column time.

When the flip-flops in counter 73 assume a terminal configuration, an End of C15 time signal is generated on line 74. Line 74 is the set input to flip-flop 63, and when the End of C15 time signal is generated on line 74, flip-flop 63 will set causing gate 62 to be disabled, shutting down the timing chain. Thus it is seen that the start pulse at the beginning of the data train starts the operation of the timing means 40 which provides timing signals for dividing the data train into indvidual space time compartments in accordance with various configurations of the counters within the timing means 40 and that operation of the timing means 40 is terminated when the column time counter 73 indicates that it has reached its terminal condition.

All the functions of the machine are referenced to the counters (FIG. 4) in the timing means 40 (FIG. 1) and depend upon them for synchronization of operation. Referring again to FIG. 1, the various configuration of the counters in the timing means 40 are sensed by the function control logic 50 on line 44, the arithmetic control logic 20 on line 42 and the display means 60 on line 46. Referring again to FIG. 1, it is seen that bits emerging from the arithmetic delay line 10 are sensed by arithmetic control logic 20 on line 12. These bits are inputs to arithmetic logc 26 and gating logic 22 and 24. These elements of arithmetic control logic 20 also have as inputs logic signals from function control logic 50 on line 28. Line 28 represents a plurality of connections to the elements within arithmetic control logic 20 but which are as a single line only shown for the purpose of simplifying the drawing. The signals on line 28 may direct that the bits emerging from the arithmetic delay line 10 be directly recirculated back onto the delay line 10 through gating logic 24 and line 14 or that they be routed through gating logic 22 into arithmetic register 30. The arithmetic register 30 comprises a series of bistable elements interconnected as a shift register. The number of bistable elements in arithmetic register 30 corresponds with the number of bits chosen to represent a digit in a number. The output of arithmetic register 30 is connected to the arithmetic control logic 20 on line 18. The bits entered into arithmetic register 30 may be serially shifted out under the control of the function control logic 50 and gated either directly onto the arithmetic delay line 10 by way of the gating logic 24 and line 14, or may be used in arithmetic logic 26, or both. Arithmetic logic 26 performs the add and subtract function of the arithmetic section. Arithmetic logic 26 will add or subtract the signals on line 18 from arithmetic register 30 and the signal on line 12 from the arithmetic delay line 10. The result of this arithmetic operation may then be copied, bit by bit as the arithmetic is being performed, into the arithmetic regster 30 through gating logic 22 on line 23, or may be shifted onto the arithmetic delay line 10 by way of line 25, gating logic 24 and line 14.

In summary, then, bits emerging from the arithmetic delay line 10 may be directly recirculated through gating logic 24 back onto the arithmetic delay line 10 or recirculated through the arithmetic register 30, then back onto the arithmetic delay line 10 by way of line 12 to gating logic 22 to arithmetic register 30 by way of line 16, shifted out of arithmetic register 30 on line 18, through gating logic 24 onto line 14. The route to be taken is determined by the function control logic 50. Addition and subtraction is accomplished serially by the arithmetic logic 26, which includes a serial binary adder, sensing bits on line 18 being shifted out of arithmetic register 30 and bits on line 12 emerging from the arithmetic delay line 10.

Hereinafter, bits emerging from the arithmetic delay line 10 and recirculated directly back onto the arithmetic delay line 10 by way of gating logic 24 will be referred to as going the short path, and bits recirculating through the arithmetic register 30 will be referred to as going the long path.

The shifting of digits referred to previously in connection with FIG. 2 is accomplished by the function control logic 50 altering the path taken by selected digits as the data train is emerging from the arithmetic delay line 10 on line 12.

The shift down, wherein all the digits or numerals within each column space-time segment are advanced one register or digit space-time segment, is performed by causing the first digit in each column, the R0 digit, to be shifted into the arithmetic register 30. The control logic 50 then switches the recirculation path to the short path so that all the subsequent digits in the same column are written directly back onto the arithmetic delay line 10. In an effort to minimize required logic, the present invention was designed to allow the arithmetic register 30 to continue copying all digits as they emerge from the arithmetic delay line 10. However, a signal from function control logic 50 on line 28 to gating logic 24 accomplished the switch by merely causing gating logic 24 to allow the bits appearing on line 12 to recirculate instead of the bits appearing on line 18. Once this is completed for each column, all the digits in each column have been advanced one register digit time with the exception of the R0 digits which have been lost.

The shift up wherein all the digits within each column are delayed or set back one register digit time, is performed by causing the first digit in each column, the R0 digit, to take the short path and at the same time be shifted or copied into the arithmetic register 30. The remaining digits in each column are also shifted into the arithmetic register 30 and then onto the arithmetic delay line 10 except for the last digit, the R4 digit. Once the R4 digit is completely contained in the arithmetic register 30, the R0 digit for the next column is beginning to emerge from the arithmetic delay line 10. The control logic 50 will cause the new R0 digit to recirculate directly as it also is copied into the arithmetic register 30. The former R4 digit is, therefore, lost. The result at the end of the data train is that the R0 digits remain in their original positions and have also been delayed one digit time to also occupy the R1 digit time. The R1, R2 and R3 digits have also been delayed one digit time. The R4 digits have all been lost.

The shift left of the digits a particular number register wherein all the digits of the number register are delayed by one column time is accomplished by causing the data train to recirculate directly (short path) except for the digits of the particular number register to be shifted. As the function control logic 50 senses from the timing means 40 that a digit of a particular number register is emerging from the arithmetic delay line 10, it will generate a signal on line 28 to cause the digit to pass through gating logic 22 and be shifted into the arithmetic register 30. The data train following the digit will resume the short path until the particular register digit time of the next column. At this time the particular register digit in that nex column is shifted into the arithmetic register 30 as the digit previously contained therein is shifted out on line 18 and through gating logic 24 onto the arithmetic delay line 10. The contents of the arithmetic register 30 will be shifted onto the arithmetic delay line 10 as it is copying a new digit for every column except the first digit column, column C2. During column C2, as the particular register digit is being copied into the arithmetic register 30, the control logic 50 will cause the arithmetic delay line 10 to have zeros entered into that digit position on the data train. Therefore, at the end of the data train, a zero has been written into the particular register digit in column C2 and the digits of the number previously contained in the number register have all been delayed one column time, or shifted left one column as illustrated in FIG. 2.

It should also be mentioned that at the end of the pass of the data train the digit previously contained in column C14 of the number register is now in the nonoperating column C15 and the digit previously in column C15 is contained in the arithmetic register 30. It is therefore possible during the next pass of the data train to cause this digit to be shifted into the column C2 position of any number register and shift the digits in that number register left one column by causing the shift left process to be repeated, except that as the first digit in the number register in column C2 is copied into arithmetic register 30, the contents of arithmetic register 30 is shifted onto the arithmetic delay line 10.

The arimthetic section of the apparatus performs its function under the direction of the function control logic 50 which, in turn, responds to commands to it from the keyboard 120. The keyboard 120 represents a "command source." Keyboard 120 may be a conventional ten-key keyboard having a plurality of digit keys representing the numerals "0" through "9," plus a variety of function keys, such as add, subtract, multiply, divide, etc., or it may be the program control section of a computer comprising merely an instruction register and associated decoding logic. In the event of the latter, the visual display means 60 could be dispensed with. At any rate the keyboard 120 may enter digits into the arithmetic section on cable 126 which represents a plurality of lines corresponding to the number of elements contained in arithmetic register 30. As each digit key is depressed, the function control logic 50 will sense it on line 122 and cause the digit inserted into register 30 to be copied on the delay line 10 in a particular position on the data train. In the present invention all digits entered are inserted into the R1 number register digit position. Each new digit entry is copied into the R1 digit position in column C2 and the previous contents of the number register R1 are shifted left one digit position in a manner previously described.

The control section includes an action step counter 56 seen in FIG. 1. Action step counter 56 comprises three bistable elements (not shown) interconnected as a counter having six consecutive counts or configurations and may be advanced from one count to another by a pulse from the control logic 50 on line 95. Line 95 represents both the signals advancing the counter 56 and the signals of the elements within counter 56 which are sensed by function control logic 50 and decoded to control various logic operations.

When the function control logic 50 receives a function command from the keyboard 120 by way of line 122, it will initiate the action step counter 56 and set a particular function indicator which remains set during the time required to complete or perform the function. For example, if the keyboard 120 was to direct that the add function be performed, an add function indicator would be set within the function control logic 50 and the action step counter 56 would be initialized. The add function indicator may be a flip-flop which could be set and reset. The logic circuits in the function control logic 50 will respond to the combination of the particular add function indicator being set and the initialized condition of the action step counter 56 and cause predetermined signals to be generated on line 28. The signals on line 28 will, in turn, result in particular action in the arithmetic section taking place. Logic circuits within function control logic 50 monitor the events occurring in the arithmetic section on line 27. Line 27 is merely representative of a plurality of lines from the elements contained within arithmetic control logic 20. As a particular act or step is performed by the arithmetic section, the function control logic 50 circuits will cause the action step counter 56 to be advanced one count. This action continues until the counter 56 assumes a terminal configuration which indicates that the function requested has been completed. When the function control logic 50 senses this indication it will cause the function indicator to be reset and the apparatus returned to an idle condition.

The data storage section in the apparatus shown in FIG. 1 provides data storage capacity. The storage delay line 80 continuously recirculates a data train of numbers (data bits) on line 82 through gating logic 88 onto line 89 and back onto the storage delay line 80. Data bits emerging from the storage delay line 80 are sensed by the timing means 90 on line 86 and also by the data transfer register 32 on line 84. Data bits emerging from the storage delay line 80 may be copied into the data transfer register 82 under the control of the function control logic 50, and data bits contained in the data transfer register 32 may be shifted out to gating logic 88 under the control of function control logic 50 and onto the data train on the delay line 80. A digit in data transfer register 32 may be transferred into the aithmetic register 30 under the control of function control logic 50 on line 34, and a digit in arithmetic register 30 may be inserted into data transfer register 32 on line 36.

The data recirculating on the storage delay line 80 is organized in a manner similar to the data train on arithmetic delay line 10 shown in FIGS. 2 and 3, except that within each column there are sixty digits, i.e. instead of each column in FIG. 3 comprising the digit order of five number registers (R0 through R4), there are sixty number registers $R_0$–$R_{59}$. The storage section, therefore, provides storage for sixty numbers of thirteen digits plus sign information.

The delay provided by the storage delay line 80 is such, in comparison with the delay provided by the storage delay line 80 can emerge, i.e. the storage arithmetic delay line 10 can make one complete pass before all sixty digits of one column of the data train on the storage delay line 80 can emerge, i.e., the storage arithmetic data train can make a completed pass for each column of digits on the storage data train. This relationship is necessary for transferring digits between the storage section and the arithmetic section. For example, a number stored in a particular number register on the arithmetic data train may be shifted left one digit on the first pass of the arithmetic data train and the most significant digit of the number register retained in the arithmetic register 30. This digit is then inserted into data transfer register 32 and once then after the first column of the storage data train appears, it is inserted into the first order portion (C1) of designated number register of the storage data train. From this time on, since the arithmetic data train will make one complete pass before the next column of the designated number register of the storage data train can appear, the next most significant digit in the number in the number register of the arithmetic data train which was shifted into the most significant digit position with the first pass of the arithmetic data train, can be obtained by again shifting the particular number register left and retaining the digit in arithmetic register 30 and be ready to be inserted in the proper position on the storage data train when it occurs.

Recalling a number from the storage delay line 80 is also simplified by the relationship between the time delay of the storage delay line 80 and the arithmetic delay line 10. A command by the keyboard 120 to recall a particular number (number register) from the storage delay line 80 will cause the function control logic 50 to generate logic signals which will result in data transfer register 32 copying the first digit (column C2) of the number of the particular number register as the storage data train recirculates. The function control logic 50 then waits until the head or start pulse of the arithmetic data train emerges from the delay line 10. The digit contained in data transfer register 32 is then shifted into arithmetic register 30. As soon the timing means 40 indicates that the first digit (column C2) of the first number register (R0) is about to emerge from the arithmetic delay line 10, the function control logic 50 will alter the recirculation path of the arithmetic data train by shifting the digit contained in arithmetic register 30 through gating control logic 24 onto the arithmetic delay line 10 and will cause the R0 number register's first digit emerging to be copied into arithmetic register 30. The previous contents of the first number register (R0) of the arithmetic data train are then shifted left as the rest of the arithmetic data train recirculates. The above-described action will all occur before the next digit of the recalled number appears on the storage data train.

Figure 4:
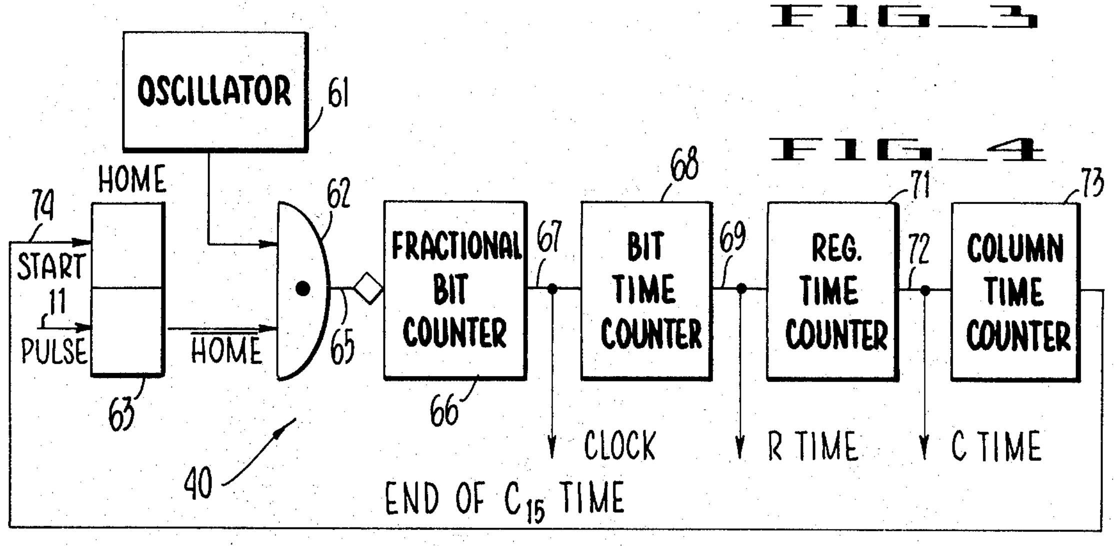
FIG. 4 is a block diagram of the timing means.

The timing means 90 in the data storage section is similar to the timing means 40 in the arithmetic section which was described in detail in connection with FIG. 4. The register time counter 71 in the figure, instead of being a five state counter, would be a counter capable of assuming sixty different configurations or counts. Each pulse received on line 69 indicating that a digit time has elapsed would advance the register time counter 71 one count. Once the reigster time counter 71 had completely recycled through all sixty configurations, a pulse on line 72 would advance the column time counter 73 one count.

Compare logic 100 will sense the various counts or configurations of the counters contained in the timing means 90 on line 55, and compare these counts with the storage location (number register) contained in the address register 110. When the configuration counts of the timing means 90 matches the storage location (number register) contained in address register 110, a signal on line 57 is generated to the function control logic 50 which will respond in a predetermined manner. Compare logic 100 thus generates a signal on line 57 once during each column time.

Referring again to FIG. 1, the address register 110 receives an input from keyboard 120 on line 124. These inputs may represent any number register from "0" through "59" and are stored in two registers (not shown) within the address register 110. The contents of these two registers are signals sensed by the compare logic 100 on line 53.

In addition to the storage and recall of numbers, the apparatus also performs arithmetic functions which will hereinafter be described.

Referring now to FIG. 5, there is shown a chart of selected arithmetic functions divided into their essential operational components or steps. Along the top and bottom of the chart is the sequence of configurations assumed by the action step counter 56 (FIG. 1) which determines the sequence of logical opeartions performed during each function.

Once the keyboard 120 has indicated to the function control logic 50, which function is to be performed and the corresponding function indicator has been set, the action step counter 56 will advance sequentially as shown in FIG. 5. The logic within function control logic 50 will generate signals to cause the apparatus to sequentially perform the operations indicated in the boxes corresponding to each function on the chart. The action step counter 56 will be advanced from one count to the next when the function control logic 50 senses that either the particular operation for that count has been completed, or in the case of a count which has no operation indicated in the chart, after one complete pass of the data train on the arithmetic delay line 10.

The function shown in the left-hand column in the chart in FIG. 5 will now be discussed in more detail.

When the ADD or SUBTRACT function is selected by the keyboard 120 and the action step counter 56 is initialized at a count of one, the function control logic 50 will cause the contents of the number registers R1 through R4 in the arithmetic delay line 10 to shift down. This only requires one pass of the data train on the arithmetic delay line 10 and as soon as the Home flip-flop 63 in the timing means 40 is set, indicating that the end of the data train has occurred, the action step counter 56 is advanced one count to a count of two.

As the data train of the arithmetic delay line 10 passes during count two of the action step counter 56, the number register R0 and number register R1 digits in each column are added or subtracted as indicated. To briefly review how this is accomplished, refer to FIG. 1. The data train emerges from the arithmetic delay line 10 on line 12. The bits in each number register R0 digit on the arithmetic data train are gated through gating register 22 into arithmetic logic 30. Then as the number register bits of the R1 digit emerge on line 12 from the delay line 10 they are sensed by arithmetic logic 26 and since the contents of arithmetic register 30 are shifted to the right, the number register R1 digit bits are added/subtracted with the corresponding bits of the number register R0 digit appearing on line 18.

The result of the arithmetic is then copied into the arithmetic register 30 by way of line 23 and gating logic 22 and then the remaining data in each column is circulated through the arithmetic register 30, with the result appearing in the number register R2.

If two digits whose sum exceeds "9" are added, the four bit result of their addition is not a correct representation of the answer in the decimal system. For example, if the binary coded decimal representation for "9" (1001) is added to the representation for a "6" (0110), the result is "15" (1111), but the answer in binary coded decimal should appear as a "5" (0101) with a carry of "1."

When the decimal system is employed then, it is necessary to alter the answer if it exceeds "9." To accomplish this the answer is copied into the arithmetic register 30 before it is shifted onto the data train so that it is corrected on the second pass through the arithmetic logic 26.

In the decimal system the correction to answers amounts to adding a constant of "6" to the arithmetic answer before it is copied onto the delay line 10. This is done as the answer digit is being shifted out of the arithmetic register 30. The answer bits of the digit appear on line 18 and are sensed by arithmetic logic 26. A constant factor of "6" is added to the digit and the bits of the corrected answer are copied into the arithmetic register 30 and then onto the delay line 10 through gating logic 24. The function control logic 50 monitors the arithmetic occurring in the arithmetic section and determines when an answer digit has exceeded the value of "9." Function control logic 50 then causes the answer digit to be corrected. The constant factor "6" may be a true output from some logic gate during bit times B1 and B2.

Using the same reasoning as above, it can be demonstrated that when the result of a subtraction is a digit greater than "9" it is necessary to subtract a value of "6" from the answer to obtain the correct result, or, in the alternative, add "10."

Returning again to FIG. 5 and the function chart, it can be seen that once the single pass of the data train necessary to combine number registers R0 and R1 has occurred, nothing else is required until the action step counter 56 assumes the zero count configuration wherein all number register R0 digits are written as zeros as they recirculate. This obviously would be done only if the answer digits had not been written into the number register R0 digit positions on the data train.

Also, note that during the count two, if, after the addition or subtraction is complete, the function control logic 50 (FIG. 1) senses that the answer contained in number register R1 is negative, i.e., an overdraft has occurred, the data train will be recirculated again so that the digits contained in number register R1 may be complemented number. To complement register R1, each digit in number register R1 is subtracted from a zero by logic in arithmetic logic 26.

Mathematically, multiplication may be described as a series of additions, that is, four times "three" is the equivalent of the addition of four plus four plus four. In the present invention, multiplication comprises adding the number contained in number register R1 to itself a number of times specified by the number contained in number register R2.

The multiplication function is initiated by a command from keyboard 120 to function control logic 50. A multiplication function indicator is set and the action step counter 56 is initialized to a count of one. When the multiplication function is initiated, the number contained in number register R1 is shifted into number register R0 and the number register R1 is cleared to all zeros. The contents of number register R2 is then shifted left one digit so that the digit previously occupying the most significant digit position (column C14) now appears in the nonoperating position (column C15). This digit then determines the number of times that the number in number register R0 is added to number register R1. After each addition the digit in column C15 of number register R2 is reduced by "1." When the digit in column C15 has been reduced to zero, the developing answer in number register R1 is shifted one column to the left to multiply it by decimal "10" and prepare it for the next cycle of addition. This process will occur for each of the number original digits contained in the register R2, that is, the contents of number register R2 will be shifted left one column thirteen times. Decimal counter 54 (FIG. 1) provides the control for the number of left shifts of number register R2. When the multiplication function is initiated, decimal counter 54 is set to a count of thirteen by functional control logic 50. Once decimal counter 54 has been counted down to zero, the complete answer has been developed.

The above described operation can be seen in its logical component elements in FIG. 6. When the multiplication function is requested by the keyboard 120, the action step counter 56 is set to a one count which results in the contents of number register R1 being shifted down into number register R0 and the decimal counter 54 being preset to a count of thirteen. When this is completed, the action step counter 56 is advanced to a two count to shift the contents of number register R2 left one column. The most significant digit of number register R2 contained in column C14, is shifted to column C15. The action step counter 56 then advances to a three count.

During the three count, the contents of number register R0 are added to number register R1 so long as the digit in number register R2 column C15 is not zero. Each addition is accompanied by a reduction by one of the digit in number register R2 column C15. When this column C15 digit is zero, the action step counter 56 is stepped to a four count. The number register R1, containing the developing answer, is shifted left one column to adjust for the order of the multiplication just completed and the count in the decimal counter 54 is reduced by one.

Also when the action step counter 56 contains a count of four it will be noted that the most significant digit (C14) of number register R1 is inserted into the least significant digit position (C2) of the number register R2 in a manner previously described. In the present invention, a saving in logic elements resulted by causing the most significant digit C14 of number register R1 to be shifted into the arithmetic register 30 at the end of the data train comprising count four of the action step counter 56 and by causing the action step counter 56 to assume a two count coincident with the end of the data train. The digit in the arithmetic register 30 is then shifted into the least significant digit position (C2) of number register R2 as the data train began its pass for while the action step is at count two. Since logic already exists to change the action step counter 56 from count four to count two at the end of such data pass, the above feature obviated the necessity of additional logic which would cause the action step counter 56 to remain in count four until the digit was shifted into the least significant digit position C2 of number register R2. The most significant digit (C14) of number register R1 is therefore shifted into the least significant position (C2) of number register R2 for each order of multiplication. This least significant digit position (C2) is open after the first left shift of number register R2 during the time that the action step counter is at count two. It can be observed that after the thirteen left shifts of number register R2 required to complete the multiplication process, the most significant digit of number register R1 finally occupies the most significant digit position C14 of number register R2. It is apparent then that number register R2 will contain the most significant portion of the answer and number register R1 will contain the least significant portion of the answer once multiplication has been completed.

Once the function control logic 50 senses that the decimal counter 54 has reached a zero count indicating that the multiplication function has been completed, it will take action to decimally align the answer. Decimal alignment merely requires that the answer, partially contained in both number registers R2 and R1, be shifted left the number of digits considered to have been left of the decimal point in the original numbers, contained in number registers R1 and R2. To do this once the machine senses that the decimal counter 54 has reached a zero count, the function control logic 50 will cause the decimal pointer indicator 52 (FIG. 1) to be set and will also cause decimal counter 54 to assume a predetermined count recognized by the machine to be the number of digits left of the decimal point. In one embodiment of the present invention, all numbers in the registers were recognized as having eight digits left of the decimal point. The machine having accomplished this will cause the contents of number register R1 to be left shifted with the most significant digit being inserted into the least significant position (C2) of number register R2, with the previous contents of number register R2 being shifted left one column. For each left shift the decimal counter 54 is counted down by one. The decimal counter 54 will therefore assume a zero count after the required number of such shifts have occurred. The function control logic 50 senses that the decimal counter 54 is at a zero count and since the decimal point indicator 52 is set, indicating that the decimal counter 54 has reached a zero count once before to end the multiplication, will cause the action step counter 56 to advance to a five count where the number registers R, R2, R3 and R4 are all shifted down. Thus the answer previously inserted into number register R2 is now shifted into number register R1. The action step counter 56 is then advanced to its terminal configuration, a zero count, and number register R0 is filled with zeros.

Just as multiplication is a series of additions mathematically, division is a series of subtractions. That is, nine divided by three is the equivalent of the number of times three can be subtracted from nine. In the present invention, number register R2 initially contains the dividend, number register R1 contains the divisor with the quotient or answer being developed in number register R2. Briefly, the number originally contained in number register R1 is shifted to number register R0 and is repeatedly subtracted from the number originally contained in number register R2. Each time a successful subtraction occurs, the machine increases a digit in register R2. At the end of the division function the number register R2 will contain the answer.

More specifically, when keyboard 120 requests a division function, the action step counter 56 is set to a one count. Referring now to FIG. 6, it can be seen that in count one the function control logic 50 will cause the contents of number register R1 to be shifted into number register R0 and the decimal counter 54 to be set to the count of fourteen. The decimal counter 54 being set to fourteen instead of thirteen as in multiplication can be explained by observing that the subtraction occurs immediately and then number register R2 is left shifted, whereas in multiplication number register R2 is left shifted before addition occurs. The reason for this will become evident hereinafter.

The action step counter 56 is advanced to a two count and then the contents of number register R0 is subtracted from the contents of number register R1. If the subtraction is successful, the least significant digit (C2) of register number R2, is incremented by one and the subtraction continues as just set forth until a subtraction results in an overdraft, that is, an unsuccessful subtraction. When this occurs the contents of number register R0 are added to number register R1 to restore number register R1 to the condition it had prior to the unsuccessful subtraction and the action step counter 56 is advanced to a count of three.

When the action step counter 56 is at a count of three, number register R2 is shifter left one column, causing the digit occupying the most significant digit position C15 to be shifted into the least significant digit position C2 of number register R1, the action step counter is then advanced to a count of four.

When the action step counter 50 contains a count of four, the number register R1 is shifted left one column and the decimal counter 54 is reduced by one. If the decimal counter 54 is not zero, the machine then causes the action step counter 56 to return to count two to continue the subtracting process. If, however, the decimal counter 54 is zero set, indicating that all of the digits originally contained in number register R2 have been shifted into number register R1, the machine will set the decimal point indicator 52 (FIG. 1) and set the decimal counter 54 to a configuration representing the number of digits recognized by the machine to be right of the decimal point. The machine will then return the action step counter 56 to count two and continue the subtracting process during which zeros are inserted into the least significant digit position of number register R1 for each shift left of number register R1. When the decimal counter 54 reaches a zero count for the second time, the machine causes the action step counter 56 to advance to a five count where a shift down for number registers R1, R2, R3 and R4 occurs. The developed answer in number register R2 is therefore shifted into number register R1. The action step counter 56 is then advanced to its terminal configuration of zero and number register R0 is written to all zeros. The shifting of number registers R1 to R2 for five counts is to decimally align the answer.

It is apparent from the above description that the present invention provides maximum arithmetic capability with a minimum of hardware.

To perform the basic arithmetic operations of addition and subtraction the present invention requires only one register, one digit in length, and serial addition logic.

The more complicated functions of multiplication and division require little additional hardware. A first counter to step the process along from one logical operation to the next and a second counter to count the number of addition/subtraction cycles to be performed is all that is required.

The present invention also provides a simple means of combining storage capability with arithmetic capability by providing a storage data train which contains a column of digits that require a longer period of time to emerge from its memory means than is required for the arithmetic data train to recirculate completely. Data transfers between the two data trains are greatly simplified eliminating any necessity for counters to synchronize the transfer as regards which column is being operated upon, etc.

Changes may be made in the combination and arrangement of parts or elements as heretofore set forth in the specification and shown in the drawings, it being understood that changes may be made in the embodiment disclosed without departing from the spirit and scope of the invention as defined in the following claims.

What is claimed is:

1. In a data handling apparatus for operating on a plurality of digits, the combination comprising:

a first memory means for receiving therein a start signal followed by a maximum quantity of digits in a time sequence and for transmitting therefrom said start signal followed by the digits so received in a time sequence;

first timing means responsive to the transmission from said memory means of said start signal for generating a plurality of time sequential digit-time indicative signals, successive ones of said digit-time indicative signals being indicative of the time of emergence of successive ones of the digits of said maximum quantity of digits from said memory means;

a first one-digit storage register for selectively receiving therein individual ones of the digits emerging from said first memory means;

first gating means responsive to selective ones of said time sequential digit-time indicative signals for routing selective ones of the digits emerging from said memory means into said storage register;

second gating means responsive to selective ones of said time sequential digit-time indicative signals for routing selective ones of the digits emerging from said memory means directly back into said memory means;

arithmetic logic means for selectively forming a result digit by the arithmetic combining of a digit received in said storage register with a digit emerging from said memory means;

said first gating means being responsive to selective ones of said time sequential digit-time indicative signals for routing said result digit to said storage register as said result digit is formed.

2. In an apparatus according to claim 1 wherein said first memory means comprises an acoustic delay line.

3. In an apparatus according to claim 1 wherein said storage register comprises a plurality of binary elements interconnected as a shift register.

4. In a data handling apparatus according to claim 1 wherein there is further included:

a second memory means for receiving therein a second start signal followed by a second maximum quantity of digits in a second time sequence and for transmitting therefrom said second start signal followed by the digits so received in a second time sequence;

said second time sequence being divided into predetermined groups of time-successive column-times, each of said column-times being divided into a predetermined plurality of groups of time successive digit-times;

individual ones of said column-times being associated with individual decimal orders of a plurality of multi-digit numbers;

second timing means responsive to the transmission from said second memory means of said second start signal for generating a second plurality of time sequential digit-time indicative signals, and a plurality of successive column-time indicative signals; successive ones of said column-time indicative signals being indicative of the time of emergence from said second memory means of successive ones of the said plurality of groups of digits associated with said individual decimal orders; successive ones of said digit time indicative signals being indicative of the time of emergence from said memory means of successive ones of the digits of said second maximum quantity of digits;

the length of time of each of said column-time indicative signals being greater than the plurality of digit-time indicative signals associated with said first timing means;

a second one-digit storage register for selective receiving therein individual ones of the digits emerging from said second memory means, and for selectively receiving therein a digit contained in said first storage register;

said first storage register selectively receiving therein a digit contained in said second storage register;

third gating means responsive to selective ones of said second plurality of digit indicative signals for routing a digit contained in said second storage register into said second memory means, and for selectively routing the digits emerging from said second memory means directly back into said second memory means.

5. In a data handling apparatus according to claim 4 wherein there is further included:

means for receiving an address of a desired digit on said second memory means, said address being the same as the digit-time indicative signal associated with said desired digit;

means for generating said desired digit address;

comparing logic means for comparing said desired digit address with the digit-time indicative signals generated by said second timing means, said comparing means generating a compare signal when said desired digit address and a digit-time indicative signal are the same;

said second storage register being responsive to said compare signal for selectively receiving therein the digit emerging from said second memory means corresponding with the digit time indicative signal that effected said compare signal; and said third gating means being selectively responsive to said compare signal and the digit time indicative signal that effected said compare signal for routing a digit contained in said second storage into said second memory means at the digit-time associated with said address contained in said address receiving means.

References Cited

UNITED STATES PATENTS

| | | | |
|---|---|---|---|
| 3,405,392 | 10/1968 | Milne | 235—156 X |
| 3,330,946 | 7/1967 | Scuitto | 235—176 X |
| 2,978,680 | 4/1961 | Schulte | 235—165 X |
| 2,917,236 | 12/1959 | Reisch | 235—176 |
| 3,278,904 | 10/1966 | Lekven | 235—165 X |

MALCOLM A. MORRISON, Primary Examiner

D. H. MALZAHN, Assistant Examiner

U.S. Cl. X.R.

235—167

PO-1050
(5/69)

UNITED STATES PATENT OFFICE
CERTIFICATE OF CORRECTION

Patent No. 3,531,632 Dated Sept. 29, 1970

Inventor(s) Joseph R. Herr

It is certified that error appears in the above-identified patent and that said Letters Patent are hereby corrected as shown below:

Column 1: line 55, change "orders" to -- order --.

Column 2: line 18, after "logic" insert -- also --.

Column 4: line 40, change "ccntinuously" to -- continuously --;
line 59, change "number" to -- numerals --.

Column 5: line 8, change "numeral" to -- numerals --;
line 20, change "to", first word, to -- of --; and change "rest" to -- reset --; and change "of" to -- to --;
line 41, change "one" to -- on --;
line 56, change "indvidual" to -- individual --;
line 72, change "logc" to -- logic --.

Column 6: line 25, change "regster" to -- register --.

Column 7: line 27, change "nex" to -- next --;
line 56, change "arimthetic" to -- arithmetic --.

Column 8: line 54, change "82" to -- 32 --;
line 59, change "aithmetic" to -- arithmetic --;
line 74, change this line to read -- arithmetic delay line 10, that the data train on the arith- --.

Column 9: line 2, delete "storage", first occurrence;
line 12, delete "once";
line 39, after "soon" insert -- as --;
line 61, change "reigster" to -- register --.
line 68, delete "configuration";
line 72, after "100" insert -- will --;
line 73, change "generates" to -- generate --.

PO-1050
(5/69)

UNITED STATES PATENT OFFICE
CERTIFICATE OF CORRECTION

Patent No. 3,531,632 Dated Sept. 29, 1970

Inventor(s) Joseph R. Herr PAGE - 2

It is certified that error appears in the above-identified patent and that said Letters Patent are hereby corrected as shown below:

Column 10: line 15, change "opeartions" to -- operations --;
line 51, after "the" delete "number register";
line 52, after "the", first occurrence, insert -- number register --.

Column 11: line 2, delete "arithmetic";
line 3, after "the" insert -- arithmetic --;
line 35, after "complemented" insert a period (.);
line 36, change "number. To complement register" to -- To complement number register --.

Column 12: line 34, after "step" insert -- counter --;
line 66, change "pointer" to -- point --.

Column 13: line 11, change "R," to -- R1, --;
line 46, after "of" insert -- number --;
line 55, change "shifter" to -- shifted --;
line 58, change "R1," to -- R1 and --.

Column 16: line 26, after "storage" insert -- register --.

Signed and sealed this 6th day of July 1971.

(SEAL)
Attest:

EDWARD M.FLETCHER,JR.
Attesting Officer

WILLIAM E. SCHUYLER, JR.
Commissioner of Patents